4240

J. B. Slawson. Fare Box

Patented Jan 24 1871

Witnesses.
H. Gardiner
W. H. Fuller

Inventor.
J. B. Slawson
by his Atty
S. Hannay

UNITED STATES PATENT OFFICE.

JOHN B. SLAWSON, OF NEW YORK, N. Y.

IMPROVEMENT IN PASSENGER-FARE BOXES.

Specification forming part of Letters Patent No. 17,899, dated July 28, 1857; Reissue No. 550, dated May 4, 1858; Reissue No. 4,240, dated January 24, 1871.

*To all whom it may concern:*

Be it known that I, JOHN B. SLAWSON, formerly of New Orleans, in the State of Louisiana, now of the city, county, and State of New York, have invented a certain new and useful Box for Receiving the Fares of Passengers in Omnibuses, Cars, &c., for the prevention of frauds on the part of drivers and conductors, in connection with such fares, upon the proprietors, &c., of which the following is a full, clear, and exact description, reference being had to the accompanying drawing, making part of this specification, in which—

Figure 5:
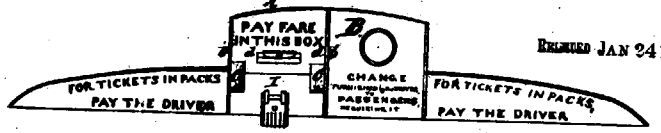
Figure 3:
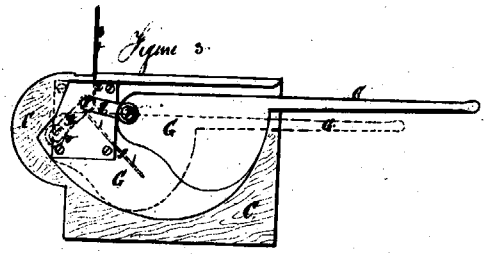
Figure 1:
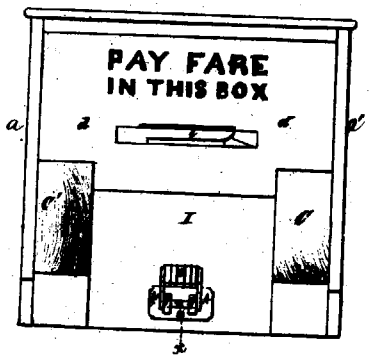
Figure 2:
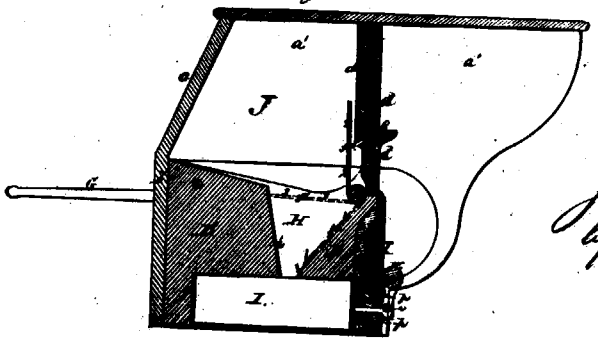

Figure 1 represents a front view of the box or apparatus suitable for use in a car, omnibus, &c. Fig. 2 represents a vertical section taken centrally through Fig. 1. Fig. 3 represents a side elevation of the box, with one side removed to show a portion of the working apparatus; and Fig. 4, a similar view of the other side. Fig. 5 represents a vertical transverse section taken across the forward end of the top of an omnibus or stage, immediately in front of one of my boxes as arranged for use.

The object of my invention is to provide a means of preventing frauds on the proprietors of cars, stages, omnibuses, and other vehicles used for the transportation of passengers for hire, by the drivers or conductors.

To effect this the apparatus employed must be capable of allowing the following conditions to be carried into effect, to wit: first, it must be a safe place of deposit as against the driver, conductor, passengers, or other persons—that is to say, sufficiently safe to prevent abstraction of fares without the use of violence; secondly, it must be so constructed as to enable the passengers themselves to deposit their fare therein, which is a duty imperatively required of them, the driver or conductor, under no circumstances, being allowed to handle or receive it; thirdly, it must be provided with two compartments or chambers, the one for the passengers to deposit their fare in, and the other to act as a receptacle for holding the accumulated fares as collected during the trip; fourthly, the chamber or compartment into which the passengers deposit their fare must be provided with an opening covered or protected by a transparent medium or device, so arranged as that the driver or conductor, as the case may be, may examine and scrutinize the fare as it is deposited, to see that the full amount of fare has been deposited in good and lawful money or genuine tickets before it is passed into the second or general receiving chamber; fifthly, the chamber into which the passengers deposit their fare must be so constructed or otherwise provided with suitable means of temporarily arresting the fare as it is deposited therein as to enable the driver, &c., to examine it for the purposes mentioned before it is passed into the second or general receiving compartment; sixthly, the chamber or compartment into which the passengers deposit their fare should be provided with an opening covered or protected by a transparent medium or device, so arranged as that when the fare is temporarily arrested therein they may be able to see and examine it before it is passed into the second or receiving chamber. By this means disputes and contentions are prevented as to the sufficiency of the amount deposited to pay the fare, or as to the genuineness of the money or tickets used for that purpose. It also enables the passenger, where he has unintentionally deposited more than the amount of his fare, to call the attention of the driver to that fact, so that he, should the passenger require the difference paid back to him, may report the case to the proprietor or his agent on reaching the end of the route, who will then pay the difference to the passenger, who, for this purpose, must ride to the office at the end of the route, the driver or conductor in no case being allowed to rectify any mistake, save at their own expense; seventhly, the apparatus must be so arranged and combined with the car or stage, &c., as to be at once convenient for the driver or conductor to examine and verify the correctness of the fare as it is deposited, without leaving his post, and for the passengers to deposit their fare therein, and, if need be, to examine it afterward; and lastly, the apparatus must be so constructed as that after the fare has been temporarily arrested for the purpose of being examined and scrutinized, as before mentioned, the fare may be passed into the second or general receiving compartment into which all the fares are collected.

My invention for the purpose of carrying these conditions into effect consists of a box divided into two chambers or compartments, into one of which is arranged a narrow and somewhat elongated orifice or mouth, through which the passengers are required to deposit their fare, which must be paid either by ticket or by the exact amount in lawful money. In one side of this chamber is arranged an opening covered or protected by a transparent medium or device, by means of which the driver or conductor may examine the fare, for which purpose the latter is temporarily arrested by means of a movable apron or partition suitably arranged in the bottom. Immediately opposite this transparent medium I arrange another in the same chamber, through which the passengers can examine the fare after they have deposited it, and before it has been passed into the second or general receiving-chamber.

The two chambers are separated from each other by means of a movable apron or partition, so constructed and arranged as to turn on bearings as on an axis when acted on by a lever. This apron, on being turned so as to depress it, suffers the fare to pass from the one chamber to the other—the one for this purpose being arranged above the other, it being both simple and efficient.

The lower chamber is occupied by a drawer which is made the receptacle of all the fares as they are collected during the progress of the trip. The drawer is provided with a lock, whereby it is securely locked to the fare-box, and is only accessible without violence to the proprietor or his agent on the arrival of the stage, car, &c., at the end of the route, where it is unlocked and its contents removed; the drawer is then replaced and relocked ready for another trip.

The fare-box thus constructed is, as a rule, arranged at the front end of the inside of the omnibus or car, so as to be within convenient reach of the driver for examination, &c., without leaving his post, the mouth side through which the fare is deposited being arranged so as to face the passengers.

In this connection it may be remarked that, as a rule, where these fare-boxes are used, the services of a conductor may be dispensed with, as the driver will be found sufficient for the purpose; yet, where a conductor is deemed necessary, as in crowded thoroughfares where there is much travel, then the box may be arranged at the rear of the car, with its opening for depositing the fare, as before, facing the passengers, the conductor in that case examining the fare instead of the driver.

To enable others skilled in the art to make, construct, and use my improved fare-box, I will now proceed to describe its parts in detail, reference being had to the accompanying drawing of the same.

The apparatus represented in the drawing for carrying my invention into practical effect consists of a box divided into two chambers J and I, or compartments, the one arranged above the other, there being an opening or passage, H, communicating between the two.

The upper chamber J is provided on one side, and which is usually the side next the end of the car or omnibus, with an opening covered or protected by a transparent medium or device, *c*, so arranged that the driver, through a corresponding opening made in the end of the car or omnibus, may look into its interior to examine the fare as it is deposited by the passengers, and on the opposite side with another opening covered or protected by a transparent medium or device, *d*, through which the passengers may also examine their fare after they have deposited it, for which purpose the fare is temporarily arrested by a suitable device before it is passed into the lower chamber I, as will shortly hereinafter be described.

Over the opening or passage H is arranged a substantial apron, *f*, of a size sufficient nearly to cover it, and in such manner as to form a movable partition between the upper and lower compartment. For this purpose it is rigidly secured at one side to a rock-shaft, F, which is mounted in bearings suitably arranged in the side pieces C and C′, which form part of the internal frame of the apparatus. On one end of this rock-shaft F is mounted and secured, in any well-known manner, one end of a crank-lever, *g*, to the other end of which is secured a wrist-pin, *v*, on which is mounted, as on a pivot, the inner end of a weighted lever, G, the other end of which is made to project through the casing of the box and the front end of the omnibus or car, within convenient reach of the driver.

By this arrangement the latter can, at his will, in the manner and for the purposes hereinafter to be described, raise or depress the apron, so as to open or close the passage H that leads to the compartment I or drawer below, as shown in Fig. 3.

In the side of the compartment J occupied by the glass window *d* is cut or otherwise formed a narrow but somewhat elongated opening or mouth, *e*, for the use of the passengers through which to deposit their fare into the box.

The lower compartment I is made of such size and shape as will enable it to receive a drawer, I, of a capacity sufficient to hold all the fares likely to be collected during one or two trips, or even of all the trips of the omnibus or car made in a day.

The front part of this drawer I is provided with a lock, by means of which it is securely locked to the front piece D of the inner frame of the apparatus.

If deemed advisable for additional security, a plate may be fitted over so as to cover the key-hole of the lock in such manner that two lugs or loops, *q*, secured and projecting from the front plate of the lock, may pass through openings cut in the plate, so that by passing the bolt *r* of a permutation-lock, *s*, through the eye of each loop *q*, and then locking it, the drawer is doubly locked, thereby furnishing a reasonable security against the abstraction of the fares from the box by the driver, conductor, passengers, or other persons.

On that end of the shaft F that has its bearings in the side piece C′ is firmly secured a lever, *o*, which is so arranged that, when the rock-shaft is suddenly turned to depress the apron *f* sufficiently to pass the money into the drawer or chamber I below, it will strike the upper end of a pivoted hammer, *n*, thereby causing its other end to strike and sound the bell *m*, which is suitably arranged and secured to the side piece C′ for that purpose.

Figure 4:
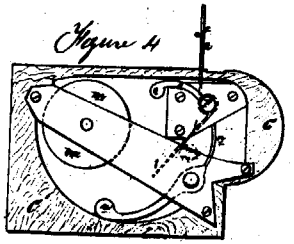

The sounding of the bell is a notice to the driver or conductor that he has depressed the apron *f* sufficiently to pass the fare from the upper to the lower chamber or general receiving-drawer. Should he otherwise not hear the sound of the bell, he must operate the lever G again until he hears it. In order that the apparatus should be as compact as possible, the bell *m*, hammer *n*, and lever *o* are arranged to operate in a recess cut in the side of the side piece C′, as indicated in Fig. 4, and so with the lever G and its adjuncts, which are also arranged in a recess cut in the side of the other side piece C, as represented in Fig. 3.

The inner frame of the box to which the working parts of the apparatus are attached consists of two side pieces, C and C′, and two cross-pieces, D and D′, firmly secured together in any suitable manner.

The passage H, which leads to the drawer or chamber I, is formed by the inclined surface *h* and *i* of the cross-pieces D and D′. The inclination of its surface serves to guide the fare into the drawer, while acting as a recess for the reception of the apron *f* on being depressed.

The normal position of the apron when arranged to arrest the fare is such as to cover the opening of the passage H, in which position it is held by means of the lever G, properly weighted so as to be self-acting in this respect.

The operative parts of the apparatus having been mounted and secured to the internal frame, substantially as described and represented in Figs. 2, 3, and 4, the whole may be incased within an outside shell, as shown in Figs. 1, 2, and 5, in such manner as to form two chambers, I and J. Of this case the transparent media *c* and *d* form part of the front and rear, for which purpose they are suitably framed in, and secured to the case, as seen in Fig. 2. Of this case, *a* and *a′* represent the sides of the box, and *b* the lower portion of the end of the box next to the driver, while the front of the drawer I, and the transparent medium *d*, act as the casing of the opposite end or side of the box. The top and bottom of the box are also suitably inclosed with covers firmly secured to the sides *a* and *a′*, thereby completing a strong and compact box.

When applied to a stage or omnibus, the roof of the vehicle may be used as the cover of the top of the box, and the front end as the side in which the transparent medium *c* is arranged; but when applied to a car it would require an independent cover to the top.

The box thus constructed is ready to be applied to any car, omnibus, or other vehicle. In the drawing, Fig. 5, it is represented as applied to an omnibus or stage, for which purpose it is arranged on one side of the elevated part of the top of the stage, while on the other side is arranged the opening through which the strap is passed that keeps the stage-door closed, and through which the driver makes change for the passengers, or sells them tickets.

When applied to a car it will be arranged lower down alongside the door-frame in the front part of the car, or in any other suitable place, so long as it is within reach and view of the driver without leaving his post, so that he can conveniently examine through the transparent medium C each fare as it is deposited by the passengers; and so that, after he has examined the fare and become satisfied of its correctness, he can pass it into the receiving drawer or chamber.

The operation is as follows: The passenger on entering, is required to pay his fare. If he has the correct amount he deposits it through the mouth *e* into the chamber J. Here it is arrested upon the apron *f*. The driver, looking through the transparent medium C, examines it. If he is satisfied that it is correct, he then forces back the weighted lever G until he hears the sound of the bell, which action will have caused the apron *f* to turn down, and thus drop the fare into the chamber or drawer I below, after which he draws the lever G forward until the apron *f* again covers the mouth of the passage H, when it is again in position to arrest the next fare. This is the operation where the lever that operates the apron is not made self-adjusting when left to itself after depressing the apron to deposit the fare; but as the driver might forget to adjust the apron properly, or fail to do it properly when he tried, it is deemed better to use a weighted lever, such as that shown in lever G of Fig. 3, which, by virtue of its specific gravity, properly distributed for the purpose, is made self-acting.

In the apparatus here described the operation of the apron *f* to deposit the fare is made the duty of the driver or conductor, and not of the passengers, this arrangement being deemed more conducive to the interests of the owners of the cars, as otherwise a dishonest passenger may deposit less than the fare, or pay it in spurious money, and then operate the apron so as to deposit it in the box below before the driver had time to examine it.

Nor is the bell *m* deemed absolutely requisite, as with a little attention the driver can always see when the fare has been safely deposited into the drawer I below.

To enable passengers to pay the exact amount of their fare, the driver is provided with a certain amount of change and tickets, which he is required to furnish to the passengers as required, he, on his return to the end of the route, being required to account for the same to the proprietor or his agent to the full amount furnished him.

Notice to the passengers that the driver can furnish them either with change or tickets is conspicuously posted on the inside of the stage; as, also, that they must deposit the exact amount of their fare in the box themselves, and warning them not to pay it to the driver, who is not allowed to receive it.

Having thus described my invention, what I claim as new, and desire to secure by Letters Patent, is—

1. A fare-box composed of two compartments, so combined that the fare, on being deposited through an opening in one of them by the passenger without the intervention of the driver or conductor, shall be temporarily arrested therein for examination and inspection by the driver or conductor through an opening therein, covered by a transparent medium, and then, when approved of, transferred directly to the second or general receiving compartment, which, as well as the first, is made inaccessible, except by violence, to the driver or other unauthorized person, for the purpose set forth.

2. A fare-box having two compartments, into one of which the fare is first deposited and temporarily arrested previously to its being deposited in the other, when the former is provided with openings covered or protected by transparent media or devices, so arranged that the passengers can see through one and the driver or conductor through the other, in the manner substantially as and for the purposes set forth.

J. B. SLAWSON.

Witnesses:
S. B. LAW,
F. E. VAN AUKEN.